United States Patent

Delvaux et al.

[11] Patent Number: 5,880,046
[45] Date of Patent: Mar. 9, 1999

[54] MOLDABLE REFRACTORY COMPOSITION AND PROCESS FOR PREPARING THE SAME

[75] Inventors: Pierre Delvaux, Bromptonville; Luc Desrosiers, Rock Forest; Marcel Gouin, Deauville; Louis Campagna, St-Denis-de-Brompton, all of Canada

[73] Assignee: Cerminco Inc., Sherbrooke, Canada

[21] Appl. No.: 12,206

[22] Filed: Jan. 23, 1998

[51] Int. Cl.$^6$ ............................ C04B 35/00; C04B 35/03
[52] U.S. Cl. ........................ 501/123; 501/95.1; 501/108; 501/111; 501/112; 501/119; 501/125; 501/133
[58] Field of Search .................................. 501/123, 154, 501/95.1, 125, 133, 108, 111, 112, 119; 106/690, 691

[56] References Cited

U.S. PATENT DOCUMENTS

| | | | |
|---|---|---|---|
| 2,687,967 | 3/1954 | Yedlick et al. | 501/154 |
| 2,992,930 | 7/1961 | Wheeler et al. | 501/103 |
| 2,995,453 | 8/1961 | Noble . | |
| 3,041,205 | 6/1962 | Iler . | |
| 3,167,439 | 1/1965 | Vukasovich et al. | 106/690 |
| 3,224,927 | 12/1965 | Brown | 162/155 |
| 3,650,783 | 3/1972 | Yates | 106/69 |
| 3,804,651 | 4/1974 | Semler | 106/691 |
| 4,152,167 | 5/1979 | Horvitz et al. | 106/690 |
| 4,604,318 | 8/1986 | Prior et al. | 106/691 |
| 4,873,209 | 10/1989 | Gnyra | 501/95 |
| 4,956,321 | 9/1990 | Barrall | 106/690 |
| 5,033,721 | 7/1991 | Gnyra | 266/280 |
| 5,360,771 | 11/1994 | Delvaux et al. | 501/80 |
| 5,362,690 | 11/1994 | Delvaux et al. | 501/95 |
| 5,612,266 | 3/1997 | Delvaux et al. | 501/123 |

Primary Examiner—Michael Marcheschi
Attorney, Agent, or Firm—Foley & Lardner

[57] ABSTRACT

This moldable refractory composition is intended to be used in the production of cast refractory pieces resistant to molten metals, especially molten aluminum. It comprises 8 to 25% by weight of an aqueous phosphoric acid solution having a concentration of phosphoric acid ranging from 40 to 85% by weight, with up to 50% of the primary acidic function of the acid phosphoric acid neutralized by reaction with vermiculite. It also comprises from 75 to 92% by weight of a mixture containing wollastonite and an aqueous suspension containing from 20 to 40% by weight of colloidal silica. The weight ratio of the aqueous suspension to the wollastonite within the mixture ranges from 0.5 to 1.2. The composition according to the invention is particularly interesting in that it can be unmolded within a very short period of time that is less than 2 hours and can be as small as 10 minutes.

18 Claims, No Drawings

MOLDABLE REFRACTORY COMPOSITION AND PROCESS FOR PREPARING THE SAME

BACKGROUND OF THE INVENTION a) Field of the invention The present invention relates to a moldable refractory composition for use to prepare refractory pieces that can handle molten metals, especially molten aluminum.

More particularly, the invention relates to a refractory composition which, after casting, can be unmolded within a very short period of time that can be as small as 10 minutes.

b) Brief description of the prior art

There are numerous refractory products known in the art, which are resistant to molten metals, like molten aluminum, and are therefore useful for handling the same. Amongst these refractory products, one can mention those prepared from compositions containing one or more heat resistant inorganic materials, like asbestos fibers, in admixture with a colloidal silica that is used as a primary binder.

As an example of such refractory products and compositions for preparing the same, reference can be made to U.S. Pat. No. 3,224,927 of 1965 to BROWN et al, which discloses a composition for preparing heat resistant products that can be formed and/or molded into rods, tubes or blocks. This composition comprises inorganic fibers, preferably asbestos fibers, bonded with from 2 to 20% by weight of colloidal silica and from 0.20 to 1.5% by weight of a positively charged starch, the above percentages being based on the weight of inorganic fibers in the composition. The above mentioned, positively charged starch is used inter alia as a secondary binder to impart strength to the cast products until a silica bonding can be developed by heating.

As another example of refractory products of the above mentioned type and compositions for preparing the same, reference can also be made to U.S. Pat. Nos. 4,873,209 of 1989 and 5,033,721 of 1991, both to GNYRA, which disclose a castable composition for preparing light weight refractory products that can be used in metal foundries especially as cementing material or as surface finishing or "face-off" material to form a protective coating layer to protect an underling article. The composition disclosed in these patents comprises a mixture of ceramic fibers and wollastonite powder and an aqueous colloidal silica having a solid content of 5 to 25% by weight. It can also comprise milled and/or screened vermiculite to adjust the density and strength of the final product. In use, the composition disclosed in the above patents is efficient. However, it has the drawback of taking about 24 hours to dry and harden at room temperature, thereby making the casting process very time consuming.

It is already known in the art that one may control and actually accelerate the setting of ceramic coating compositions containing colloidal silica as a binder, by adding thereto a phosphorus compound like phosphoric acid and its salts, especially trivalent metal phosphates. In this connection, reference can be made to U.S. Pat. Nos. 2,995,453 of 1961 to NOBLE et al; 3,041,205 of 1962 to ILER and 3,650,783 of 1972 to YATES. However, the compositions disclosed in these patents, are essentially useful as refractory binders, coatings or adhesives, and not for the preparation of cast pieces.

On the other hand, U.S. Pat. No. 5,362,690 of 1994 to DELVAUX et al discloses and claims a castable refractory composition for use in the prosecution of cast refractory pieces, having a phosphate salt as a primary binder. The composition comprises 1 part by weight of a phosphoric acid solution having a concentration ranging from 40 to 85% and its primary acidic function partially neutralized by reaction with vermiculite. It also comprises from 0.1 to 2.5 parts by weight of a mineral, preferably wollastonite, that is refractory and of fibrous structure and may react with one part of the acidic functions of the phosphoric acid that are still free or not neutralized yet. It further comprises from 0.1 to 2.5 parts by weight of another mineral such as serpentine, MgO or synthetic olivine, containing at least one cation that may react with another part of the acidic functions of the phosphoric acid that are still free or not saturated yet and from 0.28 to 1.45 parts by weight of water. When the composition disclosed in this patent is processed, it passes from a granular state to a plastic state, and then to a liquid state, without need for any external heating. At that time, it may be cast to produce refractory pieces having good thermal insulation characteristics, and in particular, a very good behaviour with respect to molten aluminium.

SUMMARY OF THE INVENTION

It has now been discovered, and this is the basis of the present invention, that one may control in a very efficient and reliable manner the mixing and molding times of a moldable refractory composition containing wollastonite as a heat-resistant inorganic material, and an aqueous solution of colloidal silica as a primary binder, if one adds to this composition an aqueous solution of phosphoric acid wherein the phosphoric acid has its primary acidic functions partially neutralized with vermiculite.

More particularly, it has been discovered that by adding an aqueous phosphoric acid solution partially neutralized with vermiculite to a mixture containing wollastonite and an aqueous solution of colloidal silica, one may reduce to less than 2 hours and actually to as low as a few minutes, the molding time required to cast refractory pieces.

Thus, a first object of the present invention is to provide a moldable refractory composition comprising a matrix consisting essentially of:

8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and 75 to 92% by weight of a mixture containing wollastonite and an aqueous suspension from 20% to 40% by weight of colloidal silica in a weight ratio of the aqueous suspension to wollastonite ranging from 0.5 to 1.2.

Preferably, the aqueous phosphoric acid solution has a concentration of phosphoric acid equal to about 55% by weight and the primary acidic functions of the phosphoric acid contained in the aqueous phosphoric acid solution are neutralized by reaction of 1 part by weight of vermiculite per 5 parts by weight of said aqueous phosphoric acid solution.

Preferably also, the aqueous suspension contains about 40% by weight of colloidal silica and about 60% by weight of water and the wollastonite consists of a mixture of about 2 parts by weight of wollastonite NYAD 400® and about 1 part by weight of wollastonite NYAD G®. In this preferred embodiment, the matrix also comprises from 10 to 20% by weight of the aqueous phosphoric acid solution partially neutralized with vermiculite.

For some applications, the composition may further comprises a reinforcing material selected from the group consisting of refractory fibers, glass fibers and fabrics made of said fibers.

A second object of the invention is to provide cast refractory pieces obtained by casting into a mold a composition as defined hereinabove and letting this composition harden in the mold.

As indicated hereinabove, the hardening time is usually lower than 2 hours and can be as low as a few minutes.

Preferably, after the composition has hardened, the piece is unmolded and can be subjected to a heat treatment at a temperature equal to or lower than 400° C.

A third object of the invention is to provide a process for preparing a moldable refractory composition for the production of cast refractory pieces, comprising the steps of:

a) neutralizing with vermiculite up to 50% of the primary acidic functions of phosphoric acid contained in an aqueous solution having a concentration of phosphoric acid ranging from 40 to 85% by weight;

b) mixing wollastonite with an aqueous suspension containing up to 40% by weight of colloidal silica in a weight ratio of said aqueous suspension to said wollastonite ranging from 0.5 to 1.2; and c) mixing the partially neutralized phosphoric acid solution obtained in step (a) with the mixture obtained in step (b) to obtain the requested moldable refractory composition, the partially neutralized phosphoric acid solution obtained in step (a) being present in a percentage ranging from 8 to 25% by weight with respect to the total weight of said partially neutralized phosphoric acid solution and the mixture obtained in step (b).

DETAILED DESCRIPTION OF THE INVENTION

As mentioned hereinabove, the process for the preparation of the moldable refractory composition according to the invention comprises a plurality of steps.

The first one of these steps consists in neutralizing up to 50% of the primary acid function of phosphoric acid with vermiculite. This step is disclosed in great detail in the above mentioned U.S. Pat. No. 5,362,690, the teaching of which is incorporated herewith by reference.

The degree of neutralization of phosphoric acid can be determined by acido-basic titration carried out with an automatic titration device like the one sold under the trademark, EMTROHM using NaOH (0.1M) as titration agent. The concentration of the $H_3PO_4$ solution that is used in accordance with the present invention ranges from 40% to 85% by weight and is preferably equal to about 55%.

The standard kinetic of neutralization of phosphoric acid is shown in Table 1, which gives the results obtained when 1 kg of vermiculite sold by GRACE under the trademark ZONOLITE® 3 is reacted with 5 kg of a 55% of $H_3PO_4$ solution sold by ALBRIGHT & WILSON. During the experiment, the container containing the vermiculite and the phosphoric acid solution was left at ambient temperature, and samples were taken after 2, 4, 24, 48 and 96 hours of reaction and subjected to chemical analysis. One can see that after 96 hours, 44% of the primary acidic function were neutralized. One can also see that the secondary and tertiary acidic functions of phosphoric acid were not neutralized by vermiculite.

TABLE 1

KINETIC OF NEUTRALIZATION OF 5 KG of $H_3PO_4$ SOLUTION 55% WITH 1 KG OF VERMICULITE

| TIME (hours) | NEUTRALIZATION (%) |
|---|---|
| 2 | 20 |
| 4 | 28 |
| 24 | 33 |
| 48 | 37 |
| 96 | 44 |

This kinetic of reaction is reproducible and therefore can be used to obtain a starting material that is of constant quality, by proper selection of the duration reaction. It is also worth mentioning that the reaction speed can be increased if wanted, by increasing the reaction temperature.

The second step of the process according to the invention consists in mixing wollastonite with an aqueous suspension of colloidal silica.

Wollastonite is a natural material comprising acicular crystals of calcium silicate ($CaO.SiO_2$). In practice, wollastonite from any industrial source may be used and no preliminary treatment needs to be carried out. However, in accordance with a preferred embodiment of the invention, use will preferably be made of the wollastonite NYAD G® and NYAD 400® sold by NYCO.

The relative proportions of wollastonite NYAD G® and wollastonite NYAD 400® may vary from 0 to 100 and 100 to 0, respectively. Experiments carried out by the Applicant have shown that a high proportion of wollastonite NYAD 400® gives to the refractory pieces a very nice surface aspect. However, unmolding cracks may appear during drying. By increasing the proportion of wollastonite NYAD G®, one may eliminate such cracks. As a matter of fact, it has been found that a wollastonite mixture containing two parts by weight of wollastonite NYAD 400® and one part by weight of wollastonite NYAD G® is the most efficient mixture for obtaining refractory pieces with no reinforcing fiber glass fabric therein, which are resistant to handling.

The aqueous solution of colloidal silica that is used, can contain from 20 to 40% by weight of colloidal silica and from 80 to 60% by weight of water. In practice, any commercially-available colloidal silica can be used. Among these commercial products, particular invention can made to the colloidal silica sold under the trademark LUDOX® by DuPONT DE NEMOURS, and particularly of the colloidal silica LUDOX HS-40® which has proved to be particularly efficient. This LUDOX HS-40® is an aqueous colloid of silica particles containing about 40% by weight of solid material and 60% by weight of water.

The weight ratio of the aqueous suspension of colloidal silica, and more preferably of LUDOX HS-40®, to the total amount of wollastonite may vary from 0.5 to 1.2. If this ratio is lower than 0.50, the resulting composition will be too dry to be properly molded. If the same ratio is higher than 1.2, the composition will be too liquid to be handled and decantation problems will occur.

The third step of the process according to the invention consists in adding the aqueous solution of phosphoric acid partially neutralized with vermiculite to the obtained mixture of wollastonite and the aqueous suspension of colloidal silica. Such an addition must be carried in such a manner that the resulting composition contains from 8 to 25% by weight of the aqueous solution of phosphoric acid partially neutralized with vermiculite, the balance consisting of the wollastonite and the aqueous suspension of colloidal silica.

As aforesaid, the invention is based on the discovery that such an addition of a solution of phosphoric acid partially neutralized by vermiculite to a conventional mixture of wollastonite and colloidal silica permits to substantially reduce the working time during the preparation of the composition and the molding time that is required to obtain any refractory piece.

As it has already been explained in the "Brief description of the prior art" given hereinabove, the existing mixtures of wollastonite and colloidal silica like LUDOX must be heated after casting in order to permit the unmolding of the refractory pieces. Indeed, the pieces made from these existing mixtures and held in a mold at ambient temperature remain in a gelatinous state, even after a period of time of 24 hours, and are therefore very difficult not to say impossible to unmold and handle.

On the other hand, the addition of phosphoric acid or of a phosphoric acid salt as such, as it has also been proposed in the prior art, does not permit to obtain reproducible results as far as the mixture preparation time and the unmolding time are concerned.

Very surprisingly, it has now been found that the addition of a solution of phosphoric acid partially neutralized with vermiculite permits to obtain in a very predictable manner a mixture preparation time and an unmolding time that are much shorter than so far. This is very difficult to explain. However, it seems that this phenomena is related to the reaction temperature. Indeed, it has been found that the amount of the aqueous solution of phosphoric acid partially neutralized by the vermiculite that must be added to the mixture in order to obtain good result, must be sufficient (viz. equal to at least 8% by weight) to create, within the composition in the mold, a slightly exothermic reaction.

In order to demonstrate the efficiency of the process according to the invention, different compositions according to the invention were prepared and tested. The formulations of the so-tested compositions and the unmolding times of the refractory pieces that were made from them are reported in Table 2.

The so prepared solution of phosphoric acid partially neutralized with vermiculite was then mixed with a mixture of wollastonite and with an aqueous suspension of colloidal silica of trademark LUDOX HS-40® in an HOBART mixing apparatus having a volume of 30 liters. The resulting mixture weighted about 22 kg and was molded into refractory pieces in the form of bricks having the following dimensions: 9.5"×4.5"×2.5". In all the tested formulations, the mixture of wollastonite that was used contained two parts of wollastonite NYAD 400® and one part of wollastonite NYAD G®.

The composition whose formulation is numbered 1 had a LUDOX® to wollastonite ratio equal to 1 and do not contain phosphoric acid partially neutralized with vermiculite. After 24 hours in the mold, this composition No. 1 was still in a gelatinous state and difficult to handle.

Under the same conditions of preparation as above, the composition whose formulation is numbered 2 to and which contained 5% only of the aqueous solution of phosphoric acid partially neutralized with vermiculite, had an unmolding time of 16 hours.

In full contrast, the composition whose formulations are numbered 3 to 7 and which contained 8, 10, 12, 16 and 20% by weight of the aqueous solution of phosphoric acid partially neutralized with vermiculite, respectively, had aqueous unmolding times of 90, 20, 15, 10 and 8 minutes, respectively.

The composition whose formulations are numbered 8, 9, 10 and 11, were different from the previous ones, inasmuch their LUDOX® to wollastonite ratios were different from 1 and actually equal to 0.82, 0.75, 0.69 and 0.57, respectively. These compositions contained 11 and 12% by weight of the aqueous solution of phosphoric acid partially neutralized with vermiculite, respectively. As can be seen, the unmolding times of the refractory pieces made from these compositions ranged from 20 to 15 minutes.

In view of the above, it is obvious that the composition according to the invention can be used for the manufacture of the cast refractory pieces of any requested shape, like those that are usually needed in the metallurgy industry.

These compositions can be reinforced by any suitable reinforcing material. In practice, use be made of refractory

TABLE 2

FORMULATIONS AND UNMOLDING TIMES

| NO. (#) | WOLLASTONITE (%) | LUDOX (%) | $H_3PO_4$ VERMICULITE | UNMOLDING TIME | DENSITY |
|---|---|---|---|---|---|
| 1 | 50 | 50 | 0 | 24 h. | — |
| 2 | 47.5 | 47.5 | 5 | 16 h. | — |
| 3 | 46 | 46 | 8 | 90 min. | 1.27 |
| 4 | 45 | 45 | 10 | 20 min. | 1.25 |
| 5 | 44 | 44 | 12 | 15 min. | 1.28 |
| 6 | 42 | 42 | 16 | 10 min. | 1.09 |
| 7 | 40 | 40 | 20 | 8 min. | 1.12 |
| 8 | 49 | 40 | 11 | 20 min. | 1.25 |
| 9 | 51 | 38 | 11 | 15 min. | 1.35 |
| 10 | 52 | 36 | 12 | 15 min. | 1.45 |
| 11 | 56 | 32 | 12 | 15 min. | 1.45 |

In all these formulations, the aqueous solution of phosphoric acid partially neutralized with vermiculite that was used as starting material was prepared by mixing 20 kg of $H_3PO_4$ 55% with 4 kg of vermiculite ZONOLITE® 3 in an HOBART mixing apparatus. The obtained mixture was filled in a plastic container and kept on storage during a period of four days before being used.

fibers, glass fibers or any fabric made of such fibers. When use is made of a fabric as reinforcing material, the composition of the invention can be applied by spraying or dipping. This permits to obtain very thin plates. As a matter of fact, it has been found that the composition according to the invention can be applied to a mat made of glass fibers, that can subsequently be rolled up to form tubes.

The invention and its advantages will be better understood upon reading the following non restrictive examples.

EXAMPLE 1

20 kg of an aqueous solution of $H_3PO_4$ having an acid concentration of 55% were mixed in a HOBART mixing apparatus with 4 kg of vermiculite ZONOLITE® 3 sold by GRACE. The mixing time was about 2 min. The obtained mixture was filled in a plastic container that uses hermetically sealed, and was stored for a period of four days before being used.

19.5 kg of a suspension of LUDOX HS-40® and wollastonite was prepared in a HOBART mixing apparatus having a volume of 30 liters, by incorporating 7.3 kg of wollastonite NYAD 400® and 3.4 kg wollastonite NYAD G® to 8.8 kg of LUDOX HS-40®. The suspension of LUDOX and wollastonite was mixed for about 2 min. at middle speed within the HOBART mixing apparatus.

2.5 kg of the aqueous solution of phosphoric acid partially neutralized with vermiculite, were added to the 19.5 kg suspension of LUDOX® and wollastonite and the resulting mixture was stirred for 2 min. at middle speed within the HOBART mixing apparatus.

The composition in a liquid form was cast into a mold having 5 cavities to form a corresponding number of bricks of the following dimensions. 9"×4.5"×2.5". The bricks were unmolded after 20 min. They were dried for 10 hours at 110° C. and fired for 4 hours at 375° C.

Table 3 gives the mechanical characteristics for the obtained bricks.

TABLE 3

MECHANICAL PROPERTIES

| | |
|---|---|
| Density | 1.25 |
| Cold Crushing Strength ASTM C-133 (psi) | 2135 |
| Modulus of Rupture ASTM C-133 (psi) | 840 |

Table 4 gives the cold crushing strength and the modulus of rupture of the same bricks after heating at 110° C., 400° C., 700° C. and 850° C., respectively.

TABLE 4

MECHANICAL PROPERTIES AFTER HEATING

| | HEATING TEMPERATURE (°C.) | | | |
|---|---|---|---|---|
| | 110 | 400 | 700 | 850 |
| Cold Crushing Strength | 1805 | 2135 | 1611 | 1668 |
| Modulus of Rupture | 916 | 840 | 854 | 860 |

The refractory pieces that were so obtained had an excellent behaviour in the presence of molded aluminum alloys. By way of example, samples of the so obtained bricks were dipped in a molten alloy containing 95% aluminum and 5% magnesium at 850° C. Suitable amounts of magnesium were added daily to maintain a concentration of magnesium to the value of 5% within the molten alloy. After 96 hours, the refractory bricks dipped into the molten alloy had no visually detectable cracks or damages.

EXAMPLE 2

A mixture of 19.5 kg of a suspension of LUDOX HS-40® and wollastonite was prepared in a same manner as disclosed in example 1. 3.5 kg of an aqueous solution of phosphoric acid partially neutralized with vermiculite were also prepared in the same manner as disclosed in example 1, and were added to the mixture of LUDOX HS-40® and wollastonite. The mixture was mixed for 2 min. at middle speed in an HOBART mixing apparatus.

The composition was cast in a polyurethane mold having five cavities shaped and sized to form a corresponding number of spoons for sampling molted aluminum. These spoons had an individual volume of 0.340 liter. There were easily unmolded after 10 min. and could support the drying and subsequent filing steps without any mechanical damages.

EXAMPLE 3

5 kg of a suspension of LUDOX HS-40® and wollastonite was prepared by adding 2.5 kg of wollastonite NYAD 400® to 2.5 kg of LUDOX HS-40® in an HOBART mixing apparatus. The obtained suspension of LUDOX® and wollastonite was mixed for 2 minutes at middle speed within the HOBART apparatus.

0.375 kg of an aqueous solution of phosphoric acid partially neutralized and prepared as disclosed in example 1 was added to these 5 kg suspension of LUDOX® and wollastonite.

Pieces of fiber glass fabric of type E having a surface of 12"×12" were impregnated with the suspension of LUDOX® and wollastonite after the aqueous solution of phosphoric acid partially neutralized with vermiculite was added thereto. Each piece of impregnated fabric had a thickness of about 0.75 mm. The pieces of impregnated fabrics were individually dried to obtain thin plates, or were stacked one above the other to form a plate of high thickness. The fabric that was used was made of glass fiber of type E and was of the type 32L sold by PYROTEK INC. The plates made of a single sheet and those made of sheets stacked to achieve the requested thickness were easy to handle after about 2 hours.

The obtained products were dried for 10 hours at 110° C. and fired for 5 hours at 375° C. After firing, the percentage by weight of glass fiber fabric within the final product was about 35% by weight. The density of the obtained product was 1.60 and its flexion resistance and flexion elasticity modulus (ASTM D-790-86) were respectively equal to 3000 psi and 610 kpsi. Its shock resistance measured according to ASTM D256-87 was about 45 kg cm/cm$^2$.

EXAMPLE 4

A refractory tube 13" long, 0.5" thick and with an internal diameter of 3" was manufactured by rolling a fabric of glass fiber of type 32L having a width of 13" and a length of 100" about a shaft having a diameter of 3". Just before rolling, the fiber glass fabric was impregnated with a suspension of LUDOX® and wollastonite to which was previously added an aqueous solution of phosphoric acid partially neutralized with vermiculite as described in example 3.

The tube that was so formed was unmolded after 2 hours. It was then dried at 110° C. for 10 hours and fired for 5 hours at 375° C. After firing, the amount of fiber glass fabric within the final product of about 35% by weight and the density of final product was about 1.60.

It is obvious that numerous modifications could be made to the preferred embodiments of the invention disclosed hereinabove without departing from the scope of the invention as defined in the appended claims.

We claim:

1. A moldable refractory composition comprising a matrix consisting essentially of:
   8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and
   75 to 92% by weight of a mixture containing wollastonite and an aqueous suspension containing from 20 to about 40% by weight of colloidal silica, wherein the mixture has a weight ratio of said aqueous suspension to said wollastonite ranging from 0.5 to 1.2.

2. The composition of claim 1, wherein:
   the aqueous phosphoric acid solution has a concentration of phosphoric acid equal to about 55% by weight.

3. The composition of claim 2, wherein:
   the primary acidic functions of the phosphoric acid contained in the aqueous phosphoric acid solution are neutralized by reacting 1 part by weight of vermiculite per 5 parts by weight of said aqueous phosphoric acid solution.

4. The composition of claim 1, wherein:
   the aqueous suspension contains about 40% by weight of colloidal silica and about 60% by weight of water.

5. The composition of claim 1, further comprising:
   a reinforcing material selected from the group consisting of refractory fibers, glass fibers and fabrics made of said fibers.

6. The composition of claim 1, wherein the aqueous phosphoric acid solution is present in an amount of between 10 to 20% by weight.

7. The composition of claim 3, wherein the aqueous suspension contains about 40% by weight of colloidal silica and about 60% by weight water; and the aqueous phosphoric acid solution is present in an amount of between 10 to 20% by weight.

8. The composition of claim 7, further comprising:
   a reinforcing material selected from the group consisting of refractory fibers, glass fibers and fabrics made of said fibers.

9. A cast refractory piece produced by molding the composition as defined in claim 1 and letting said composition harden in the mold.

10. The cast refractory piece of claim 9, wherein, after the composition has hardened, said piece is removed from the mold and subjected to a heat treatment at a temperature equal to or lower than 400° C.

11. A cast refractory piece produced by molding the composition as defined in claim 5 and letting said composition harden in the mold.

12. The cast refractory piece of claim 11, wherein, after the composition has hardened, said piece is removed from the mold and subjected to a heat treatment at a temperature equal to or lower than 400° C.

13. A cast refractory piece produced by molding the composition as defined in claim 8 and letting said composition harden in the mold.

14. The cast refractory piece of claim 13, wherein, after the composition has hardened, said piece is removed from the mold and subjected to a heat treatment at a temperature equal to or lower than 400° C.

15. A process for preparing a moldable refractory composition for the production of cast refractory pieces, comprising the steps of:
   a) providing a phosphoric acid solution having primary acidic functions and partially neutralizing the primary acidic functions of said phosphoric acid solution by reacting it with up to 50% vermiculite, said phosphoric acid solution having a concentration of phosphoric acid ranging from 40–85% by weight;
   b) mixing wollastonite with an aqueous suspension containing from 20 to about 40% by weight colloidal silica, wherein the mixture has a weight ratio of said aqueous suspension to said wollastonite ranging from 0.5 to 1.2; and
   c) mixing the partially neutralized phosphoric acid solution obtained in step (a) with the mixture obtained in step (b) to obtain said moldable refractory composition, the partially neutralized phosphoric acid solution obtained in step (a) being present in an amount ranging from 8 to 25% by weight with respect to the total weight of said partially neutralized phosphoric acid solution and said mixture obtained in step (b).

16. The process of claim 15 wherein:
   in step (a), the aqueous phosphoric acid solution has a concentration of phosphoric acid equal to about 55% by weight and the primary acidic functions of the phosphoric acid contained in the aqueous phosphoric acid solution are neutralized by reacting 1 part by weight of vermiculite per 5 parts by weight of said aqueous phosphoric acid solution;
   in step (b), the aqueous suspension contains about 40% by weight of colloidal silica and about 60% by weight water; and
   in step (c), 10 to 20% by weight of said aqueous phosphoric acid solution partially neutralized with vermiculite is mixed with the mixture of step (b).

17. The process of claim 15, comprising the additional step of:
   d) adding to the moldable refractory composition obtained in step (c) a reinforcing material selected from the group consisting of refractory fibers, glass fibers and fabrics made of said fibers.

18. The process of claim comprising the additional step of:
   d) adding to the moldable refractory composition obtained in step (c) a reinforcing material selected from the group consisting of refractory fibers, glass fibers and fabrics made of said fibers.

* * * * *